US006125988A

United States Patent [19]
Waters

[11] Patent Number: 6,125,988
[45] Date of Patent: Oct. 3, 2000

[54] SYSTEM AND METHOD FOR PROVIDING FAREBOX ACCOUNTABILITY

[75] Inventor: Brian G. Waters, Dallas, Tex.

[73] Assignee: Agent Systems, Inc., Dallas, Tex.

[21] Appl. No.: 09/059,241

[22] Filed: Apr. 13, 1998

[51] Int. Cl.[7] ............................... G06F 7/00; G07B 15/00
[52] U.S. Cl. ......................... 194/217; 232/15; 340/825.35
[58] Field of Search ............................... 194/217; 232/15, 232/16; 340/825.35; 902/1, 2, 13

[56] References Cited

U.S. PATENT DOCUMENTS

| | | | |
|---|---|---|---|
| 4,186,977 | 2/1980 | Gilovich et al. | 232/15 |
| 4,210,801 | 7/1980 | Gomez et al. | 235/92 |
| 4,310,749 | 1/1982 | Gomez et al. | 235/29 |
| 4,372,478 | 2/1983 | Gomez et al. | 232/12 |
| 4,376,442 | 3/1983 | Gomez et al. | 133/3 |
| 4,380,316 | 4/1983 | Glinka et al. | 232/16 |
| 4,407,312 | 10/1983 | Davila et al. | 133/8 |
| 4,453,667 | 6/1984 | Zerfahs | 232/7 |
| 4,471,905 | 9/1984 | Sloma et al. | 232/12 |
| 4,474,281 | 10/1984 | Roberts et al. | 194/1 |
| 4,730,117 | 3/1988 | Zack | 250/568 |
| 4,795,087 | 1/1989 | Procak | 232/7 |
| 4,877,179 | 10/1989 | Baker et al. | 232/7 |
| 4,908,769 | 3/1990 | Vaughan et al. | 340/825.35 |
| 4,977,502 | 12/1990 | Baker et al. | 364/405 |
| 5,224,579 | 7/1993 | Brown | 232/16 |
| 5,225,665 | 7/1993 | Zerfahs et al. | 235/384 |
| 5,415,264 | 5/1995 | Menoud | 194/217 |
| 5,458,285 | 10/1995 | Remien | 232/15 |
| 5,477,952 | 12/1995 | Castellano et al. | 194/217 |
| 5,574,441 | 11/1996 | Roes et al. | 340/870 |
| 5,819,901 | 10/1998 | Filiberti | 194/202 |
| 5,875,879 | 3/1999 | Hawthorn | 232/15 |

*Primary Examiner*—Robert P. Olszewski
*Assistant Examiner*—Bryan Jaketic
*Attorney, Agent, or Firm*—Fulbright & Jaworski L.L.P.

[57] ABSTRACT

A system and method are shown for providing accounting for the collection of monies in a plurality of independently operated transaction stations. Each transaction station is provided with a uniquely identifiable secure cashbox or vault in which to store monies received in a transaction. The transaction stations include electronics sufficient to validate, verify, and tally received monies. The transaction stations record information with respect to the received monies as well as the identification of the cashbox into which it is stored. The transaction stations are probed upon removal of the cashbox in order to download the recorded information into a control system. The removed cashboxes securely contain the received monies until opened in a secure environment for emptying. When emptied, the money contents are independently verified and matched with the unique identification of the cashbox from which it came. Thereafter, the probed information from the transaction station is compared against the information with respect to independent verification of the cashbox.

56 Claims, 8 Drawing Sheets

SYSTEM AND METHOD FOR PROVIDING FAREBOX ACCOUNTABILITY

REFERENCE TO RELATED APPLICATIONS

The present application is related to concurrently filed, co-pending, and commonly assigned United States patent applications entitled: "Automatic Validating Farebox System And Method," Ser. No. 09/059,274; "Configurable Cashbox," Ser. No. 09/059,694; and "System And Method For Coin Singulation," Ser. No. 09/060,033, the disclosures of which three applications are incorporated herein by reference.

TECHNICAL FIELD OF THE INVENTION

The present invention relates to an automated currency receiving farebox and, more particularly, to the use of the farebox and a secure cashbox removably coupled thereto to prove accountability for the collections of individual fareboxes.

BACKGROUND OF THE INVENTION

It is common today to provide for the automated acceptance of currency in transactions. For example, transit busses in the United States and Canada are normally equipped with a farebox to collect fares from riders and securely store the coins, tokens, and bills used to pay these fares. Fareboxes are either non-registering or registering.

A non-registering farebox is typically a locked cashbox with an inspection area where the operator can view the monies inserted by a patron to determine if a proper amount has been tendered. After verification by the operator, a "dump" lever is actuated by the operator and the payment is dropped to a cashbox below. These non-registering fareboxes do not count monies, i.e., individual notes and coins and their denominations, accepted.

Currently the registering farebox is preferred in the United States and Canada. A registering farebox is generally an electromechanical device which measures coins and bills by physical size, keeps a record of monies accepted, deposits the accepted monies in a cashbox, and allows the operator to record other limited information using a simple keypad.

Prior art fareboxes make a determination of the value of coins by measuring the coin diameter. Therefore, these fareboxes are susceptible to erroneous determinations when presented objects of similar diameter, such as washers and slugs.

Prior art fareboxes make a determination of the value of notes by making an assumption that all documents inserted into a note acceptor of the farebox which are of a certain length are a particular value bank note, i.e., a one dollar note. However, this assumption is flawed as notes having a same length may be of a different denomination. Moreover, the item, although being of the correct length, may not be legal tender at all.

In order to compensate for the above described deficiencies, these fareboxes display the coins and notes to the operator, such as through the window of an escrow area, for verification that valid coins and notes have been accepted. However, with the advent of color copiers and inexpensive desktop publishing systems, it is very simple to generate a counterfeit note sufficient to fool an operator when presented for verification in the escrow area of these prior art fareboxes. Similarly, as it is generally a number of coins that are tendered and these coins are presented in an escrow area for viewing loosely, i.e., coins may be positioned in such a way as to obscure other coins, it is very difficult for the operator to verify the coins. This difficulty is compounded by the fact that there is typically a rush of patrons wishing to tender a fare, such as at a busy bus stop, and, accordingly, the operator is not afforded sufficient time to properly verify the monies tendered. Therefore, in addition to requiring a large amount of time and attention from an operator, verification of the accepted monies by these individuals is not very accurate.

After the coins and notes are accepted by the registering farebox and visually verified by the operator, they are dumped into a cashbox. These cashboxes consist of heavy metal containers with separate compartments for coins and notes. Generally the compartments are of equal size and receive the coins and notes loosely. Accordingly, as notes are accepted, they are deposited in the cavity loosely to collect randomly at the bottom of the cavity. As such, the collected notes may curl, fold, and rest in different orientations to require a much larger area for storage than if the notes were neatly stacked in a same orientation.

These cashboxes may include separation of notes and coins. However, even if notes and coins are kept within separate areas in the cashbox, these cashboxes are commonly emptied into a common revenue container immediately after they are removed from the bus. These common revenue containers also commonly have separate areas for notes and coins. Preparing notes for counting requires sorting by hand in order to stack and face the notes.

Hand sorting is further exasperated by the fact that the notes are stored loose in the cashbox. As such, the notes are neither stacked nor faced, i.e., having the front of each bill facing the same direction, as generally required by automated note sorting and counting apparatus. Accordingly, in addition to sorting notes from coins, hand sorting must also stack and face the notes.

The ratio of collected coins to notes may vary depending on circumstances, such as a particular route a bus travels or a change in fares where the standard fare is changed from a fraction of a dollar to a whole dollar amount. However, typical prior art cashboxes do not provide adjustability of the coin and note storage areas. Instead, these storage areas are simply designed to be large enough to accommodate the largest amount of coins likely as well as the largest amount of notes likely. However, this brute force design technique, although simple to implement, does not provide an efficient use of a limited amount of space.

A further disadvantage of the typical prior art cashbox is in accounting for receipts of individual busses. For example, because of the aforementioned problems in sorting the monies collected in prior art cashboxes, the receipts of multiple cashboxes are generally intermingled in a common revenue container. Likewise, due to the large size of the cashboxes, in order to accommodate the loosely stored notes, retaining the collected monies within the cashboxes for counting is not desirable, as the handling and space required would be prohibitive. However, this does not provide any means by which the receipts of a particular cashbox may be accounted for.

Furthermore, data generated by the prior art fareboxes is not accurate enough to balance the monies collected. On average, the reported revenue from registering fareboxes is 4% below the counted revenue. The discrepancy ranges as high as 10% for some transit systems. As a result, the audit trail created by the registering fareboxes is not accurate enough to be useful in indicating whether internal theft is occurring or not.

Moreover, because the cash from all cashboxes is dumped together, the count for each bus is not obtained separately. Consequently, fareboxes that are inaccurately counting revenue cannot be identified and, therefore, remain unrepaired. Of even more consequence, employees stealing from the collection system cannot be easily identified and stopped.

The information provided by the registering fareboxes is very limited. Initially it is noted that the accuracy of the amount of monies collected is almost entirely reliant on the verification of these monies by the operator through the glass of the farebox escrow area. Additionally, the information regarding the transactions which an operator may provide is very limited. For example, the number of events or types of fares selectable by the operator is very limited. Expanding the information possible to be entered by the operator is restricted in these systems as the keypad only includes a very limited number of keys for input, the farebox does not provide much information display for the operator, i.e., for prompting et cetera, and the operator's time is otherwise occupied with the task of verifying the accepted payments.

Therefore a need exists in the art for a fare collection and accountability system which provides reliable verification of monies collected, including both coins and notes, without the need for operator intervention.

A still further need exists in the art for the fare collection and accountability system to interact with patrons and operators to efficiently conduct transactions, such as through rapid acceptance and verification of monies, meaningful messaging to the patron and operator including displaying a tally of verified monies, allowing the operator robust information input, and compact storage of accepted notes and coins.

A yet further need exists in the art for the fare collection and accountability system providing accurate reconciliation of the monies collected including robust storage of information with respect to transactions, identification of a cashbox in which the monies are stored, and reliable information regarding the amount of monies collected on a unit by unit basis.

A need also exists in the art for the fare collection and accountability system to conveniently present the stored coins and notes separately for accounting purposes.

A still further need exists in the art for the storage of notes by the fare collection and accountability system to be in a tight stack having a common orientation and common facing to allow for automated handling of collected notes.

A further need exists in the art for the fare collection and accountability system to bring real time data from collection systems together with actual coin and note count information for automatic generation of accurate and timely reports.

SUMMARY OF THE INVENTION

These and other objects, features and technical advantages are achieved by a system and method which provides a complete systems approach so that all transaction station data and cash collections are matched automatically. Accordingly, a plurality of self contained transaction stations, which in the preferred embodiment are validating fareboxes, providing automated validation of both coins and notes without operator intervention so as to more rapidly and accurately determine amounts tendered by patrons, are deployed for use in conducting point of sale transactions. A preferred embodiment of a farebox adapted for use according to the present invention is shown and described in the above referenced patent application entitled "Automatic Validating Farebox System And Method."

In conducting transactions, cash fares are paid into and registered by the fareboxes. The monies accepted and retained by the fareboxes are securely stored in a removable cashbox, preferably having machine readable identification for automated handling. A preferred embodiment of a cashbox, including machine readable identification information, is shown and described in the above referenced patent application entitled "Configurable Cashbox."

Additionally, the farebox is preferably adapted to accept machine readable information, such as magnetic and smart card tickets, presented by patrons in conducting a transaction. These items are also read and registered by the farebox.

Preferably, the farebox of the present invention is adapted to register robust information regarding a transaction. Accordingly, in addition to the cash monies received and accepted and the machine readable information presented by patrons in conducting a transaction, other information may be solicited or polled for registering in the farebox. For example, an operator may input information with respect to the transaction. Likewise, information with respect to a transaction may be received from devices external to the farebox, such as a city bus in which the farebox is mounted.

At selected times, such as at the end of a shift or day, information from the fareboxes are probed. For example, when a city bus in which a farebox is mounted returns to the garage, a revenue worker downloads data from the farebox.

Preferably, download of information from the fareboxes is accomplished using a high speed data unit which, in the preferred embodiment is a revenue station. This revenue station may be coupled to a farebox, from which downloaded information is being received, by wireless connection, such as through infrared or radio frequency links. The revenue station is also preferably coupled to a central system to which downloaded information is transferred. The revenue station may store downloaded information for later transmission to the central system, to allow a revenue worker to probe multiple fareboxes in the field or dispersed throughout a service garage, and then subsequently transmit their information to the central system such as through a wireless link there between. Preferably, however, the link with the central system provides real time download of information from the fareboxes to the central system.

The preferred embodiment of the cashbox includes sufficient storage area to securely store a substantial amount of collected monies. Accordingly, a determination is made upon downloading of information from the farebox as to whether the amount of revenue in the cashbox is equal to or greater than a preselected amount. If so, a secure panel on the farebox is released, preferably automatically upon successful probing by the revenue station, to expose the cashbox for removal. Accordingly, the cashbox may be removed from the farebox immediately after the transaction data is downloaded to the revenue station and/or the central system.

All removed cashboxes are preferably transported to a secure money room having a counting station including a note counter, a coin counter, and a cashbox ID reader coupled to the central system, such as through a money station computer. In the money room the machine readable cashbox identification information is read, the coins and notes are counted, and the count information is transmitted to the central system. The central system operates to automatically match the cash count information with the probed information for that cashbox. Accordingly, accounting reports for system wide collections as well as detailed reports for particular routes, times of days etcetera, may be automatically and accurately generated. Moreover discrepancies between the information probed from their corresponding fareboxes and the actual monies counted from the cashboxes may be flagged for investigation.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
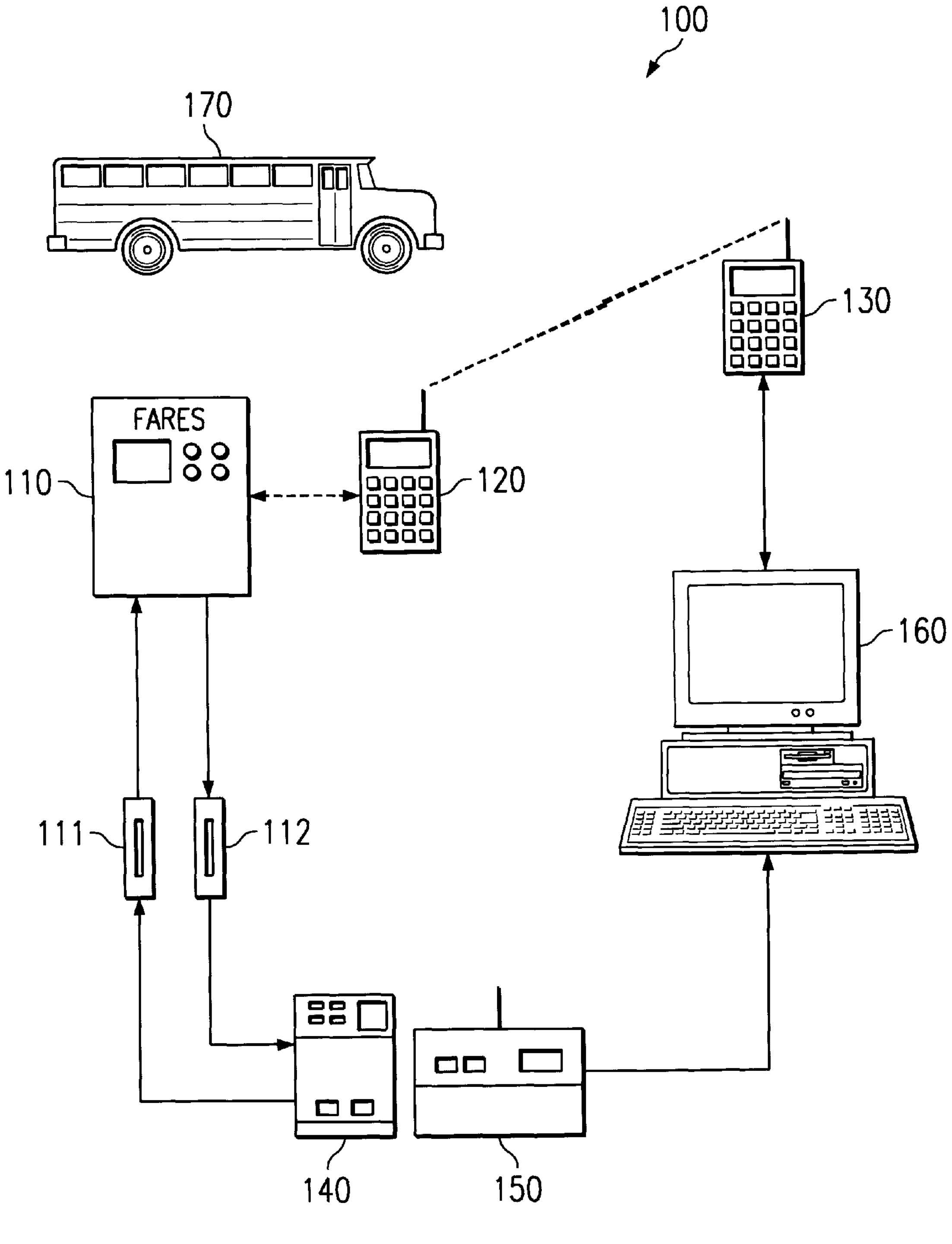
FIG. 1 shows a block diagram of a preferred embodiment of the system of the present invention.

Directing attention to FIG. 1, a block diagram of an overall system according to the present invention is shown as system 100. Accordingly, a transaction station, in the preferred embodiment a farebox such as farebox 110 which might be deployed in bus 170, is shown. A preferred embodiment of a farebox adapted for use according to the present invention is shown and described in the above referenced patent application entitled “Automatic Validating Farebox System And Method.” It shall be appreciated, although a single transaction station is shown, that a plurality of such stations are preferably used according to the present invention.

In conducting transactions, cash fares are paid into farebox 110 at the point of sale by patrons. The coins and notes tendered by the patrons are automatically verified and their denomination determined for registering in a memory of farebox 110 without intervention by an operator. Additionally, farebox 110 is preferably adapted to accept machine readable information, such as magnetic and smart card tickets, presented by patrons in conducting a transaction. These items are also read and registering in a memory of farebox 110. Accordingly, a very accurate database may be compiled by farebox 110 with respect to transactions conducted, including amounts of cash monies received, machine readable discounts and passes, and even non-cash transactions such as free passes, transfers, and credit or debit card transactions.

Preferably, the farebox of the present invention is adapted to register robust information regarding a transaction. Accordingly, in addition to information regarding a transaction directly determinable through the interaction with a patron, other information may be solicited or polled for registering in the farebox. For example, an operator may input information associated with a transaction into farebox 110. This information may include a fare type, a location at which the fare was received, acceptance of an under or over payment, or the like. Likewise, information with respect to a transaction may be received from devices external to the farebox, such as bus 170 in which farebox 110 is mounted. This information may include a location at which the bus was located when the transaction occurred, such as may be provided by a global positioning system (GPS) or odometer of the bus, or the like. It shall be appreciated that a variety of information which may be associated with recorded transaction information may be provided by systems external to farebox 110, such as through coupling farebox 110 to “smart bus” systems available today.

Additionally, information in addition to that identified above may be stored by farebox 110 for use according to the present invention. For example, a processor based controller of farebox 110 may include a real time clock for providing the time at which a transaction was processed. Likewise, the controller may require an operator, such as a bus driver, to successfully identify him/herself prior to operation of farebox 110 and this identification information may be stored for use according to the present invention. Similarly, as the preferred embodiment of the present invention utilizes a removable cashbox to securely store received monies, the controller of farebox 110 may record unique identification information of this cashbox for use according to the present invention. Accordingly, transaction information stored by farebox 110 may identify for each transaction the time of the transaction, the amount tendered, including the make up of the currency down to the number and denomination of coins and notes, the operator ID, the type of fare purchased, the location of the bus at the time of the transaction, and the ID of the cashbox into which the fare was stored.

As discussed above, the monies accepted and retained by farebox 110 are securely stored in a removable cashbox such as cashbox 111 (shown empty for insertion into farebox 110) and cashbox 112 (shown removed from farebox 110 for counting monies contained therein), preferably having machine readable identification. A preferred embodiment of a cashbox, including machine readable identification information, is shown and described in the above referenced patent application entitled “Configurable Cashbox.”

At selected times, such as at the end of a shift or day when bus 170 returns to a service garage, information from farebox 110 is probed for download. In the preferred embodiment of FIG. 1, a garage revenue station is shown consisting of hand held probe unit 120 and revenue terminal 130.

Probe unit 120 is adapted to communicate with the fareboxes of the present invention, such as farebox 110, for download of information stored therein. For example, upon return of bus 170 to a service garage, a revenue worker operates probe unit 120 to establish a link with farebox 110. This link may be a wireless link, such as an infrared or radio frequency link, between probe unit 120 and farebox 110 as shown in FIG. 1. The preferred embodiment utilizes an infrared link between farebox 110 and probe unit 120 in order to provide a secure data link as well as to require their near proximity for communication. Alternatively, probe unit 120 may be physically coupled to farebox 110, such as through data cables, for information download.

In another alternative embodiment, probe unit 120 may be coupled to farebox 110 indirectly through another system. For example, a communications radio of bus 170 may be coupled to farebox 110, such as through a modem, for wireless communication of information to probe unit 120. It shall be appreciated that this alternative embodiment allows for the real time probing of farebox 110 while operated in the field. Such real time probing may be useful in determining the need of bus 170 to return to a service garage for revenue servicing, whether additional resources such as additional busses need be dispatched as determined by the number of fares collected, and even remotely determining the operational status of the farebox.

Probe unit 120 is also adapted to communicate with revenue terminal 130 of the revenue station for communication of information downloaded from the fareboxes to central system 160. The link between probe unit 120 and revenue terminal 130 may be wireless, such as an infrared or radio frequency link, as shown in FIG. 1. In the preferred embodiment, the data link between probe unit 120 and revenue terminal 130 is radio frequency to allow portability of probe unit 120 throughout a large area, such as a service garage. Alternatively, probe unit 120 may be physically coupled to revenue terminal 130, such as through data cables, for information download.

Revenue terminal 130 is coupled to central system 160 for data communication there between. The link between revenue terminal 130 and central system 160 may be wired or wireless. In the preferred embodiment, this link is through an information communication network, such as a local area network (LAN) or wide area network (WAN). Accordingly, information downloaded from farebox 110 by probe 120 to revenue terminal 130 may be communicated to central system 160 at high speeds while central system 160 is in communication with other devices, such as additional revenue terminals and the counting stations as described hereinbelow. However, the link between revenue terminal 130 and central system 160 may be any data communication link determined to be desirable, such as a wireless link, a public switched network (PSN), or even the Internet.

As described above, revenue terminal 130 provides an interface through which probe unit 120 may provide information downloaded from farebox 110 to central system 160. Additionally, revenue terminal 130 may provide additional functionality according to the present invention. In a preferred embodiment, revenue terminal 130 provides functionality such as log in of a revenue worker for probing of fareboxes according to the present invention. Of course, log in may be accomplished utilizing revenue terminal 130 through operator input of log in information at probe unit 120. Additionally, or alternatively, revenue terminal 130 provides access to selected information available from central system 160 to a revenue worker. For example, historical information with respect to monies collected by busses on particular routes may be presented to a revenue worker through revenue terminal 130 for use with deploying farebox 110, such as in determining a ratio of coin to note storage to provide in cashbox 111 inserted therein.

Figure 5A:
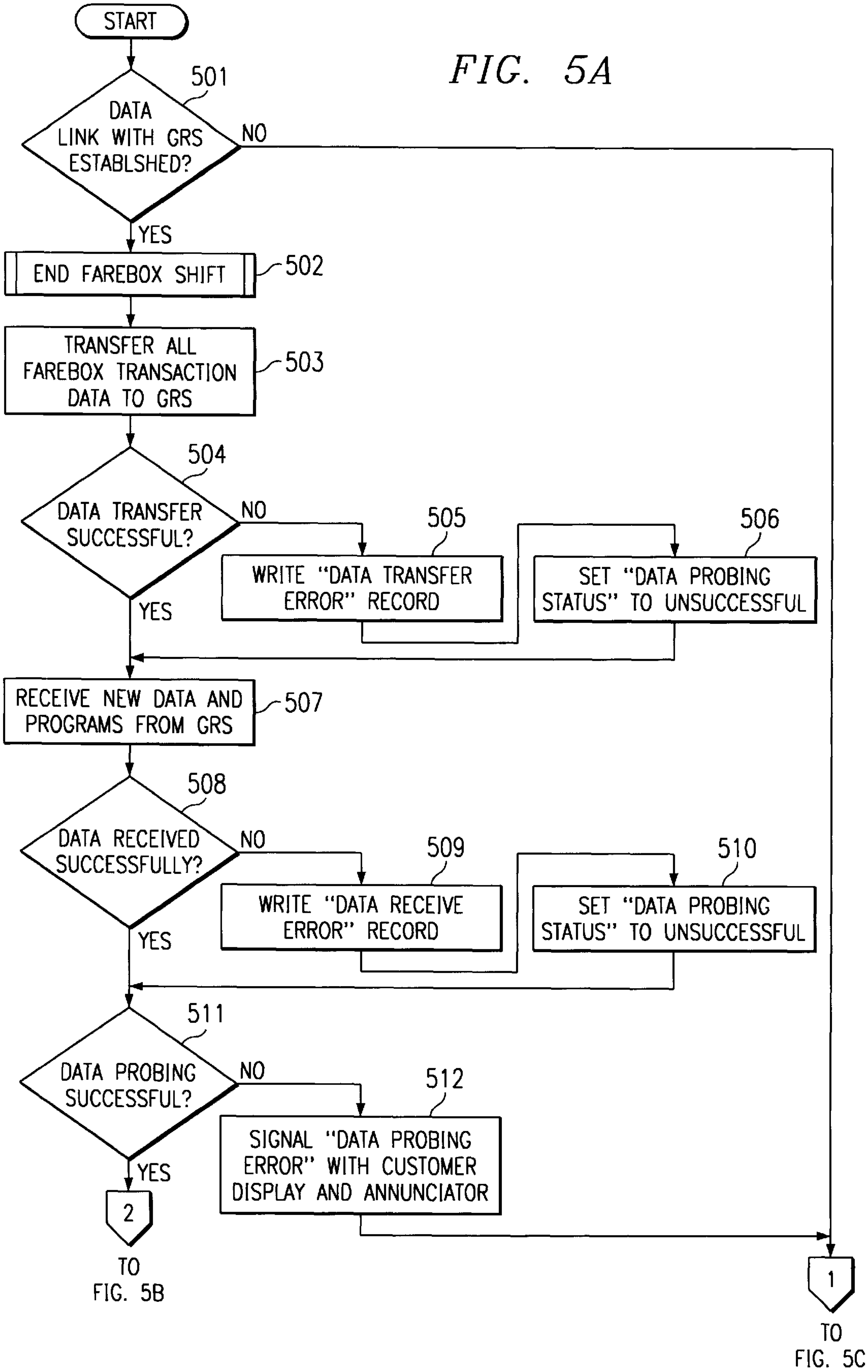
FIGS. 5A–5C show a flow diagram of the revenue service process of the system of FIG. 1.
Figure 5B:
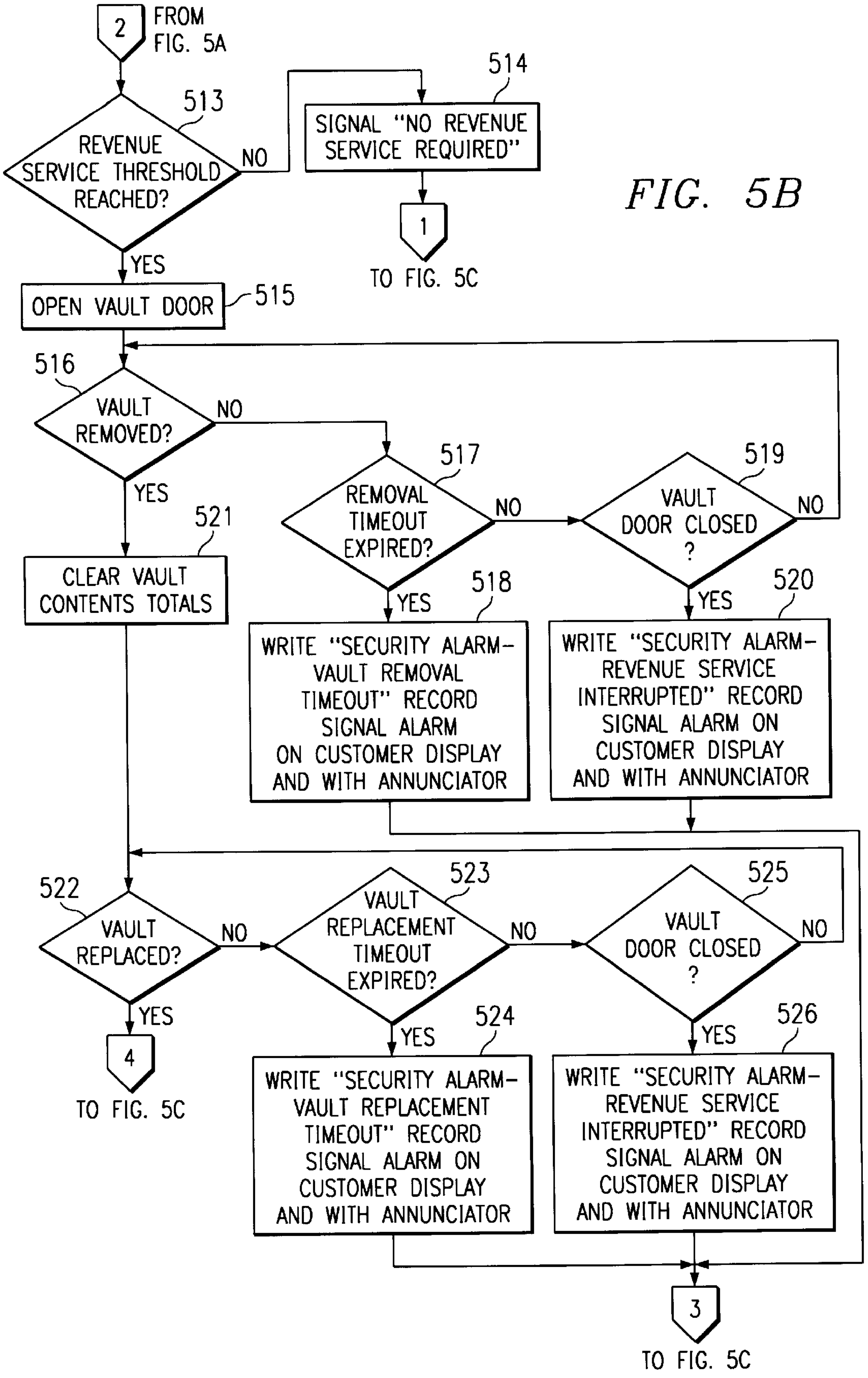
Figure 5C:
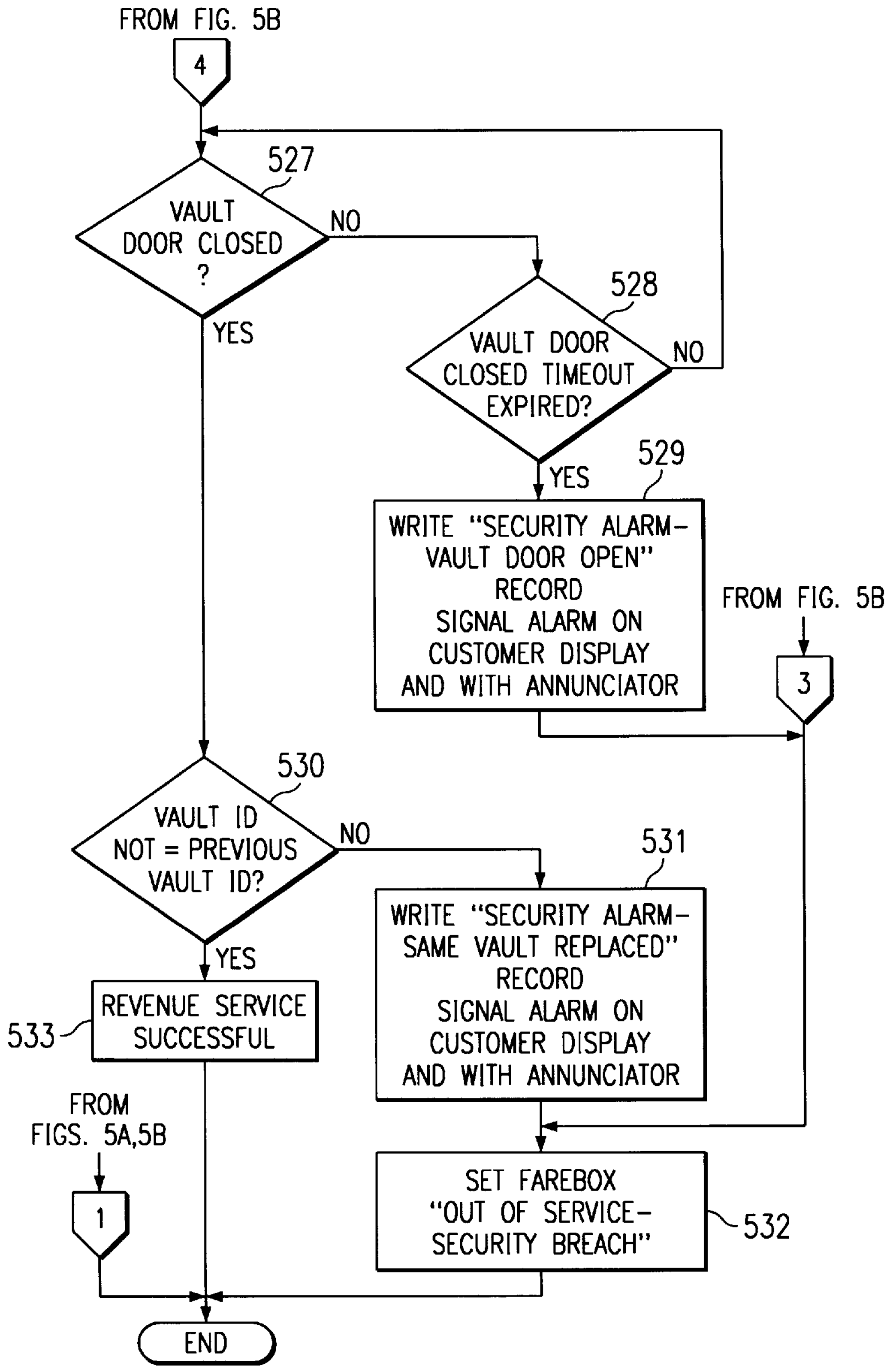

As described above, at selected times, such as at the end of a shift or day when bus 170 returns to a service garage, information from farebox 110 is probed for download by probe unit 120. Preferably, probing of farebox 110 is accomplished when a revenue worker operating probe unit 120 enters bus 170, in which farebox 110 is mounted, and establishes a data communication link with farebox 110. As successful probing of farebox 110 includes such sub-steps as resetting registers and providing physical access to secure areas of farebox 110 in the preferred embodiment, establishing a link between probe unit 120 and farebox 110, or otherwise downloading information, may include a secure or encrypted handshake there between, or the communication of passwords or the like. The steps utilized in probing a farebox are further described with respect to FIGS. 5A through 5C hereinbelow.

Once the transaction information stored in farebox 110 has been successfully downloaded for transmission to central station 160, the preferred embodiment of farebox 110 operates to release a secure panel exposing cashbox 112 having the collected monies stored therein. Of course, rather than electronically releasing the secure panel, the revenue worker may operate a lock, such as a key or combination lock, disposed on farebox 110, if desired.

The preferred embodiment of cashboxes 111 and 112 include sufficient storage area to securely store a substantial amount of collected monies. Accordingly, a determination is made upon downloading of information from the farebox as to whether the amount of revenue in the farebox is equal to or greater than a preselected amount. If so, the secure panel on farebox 110 is released, as described above, for cashbox removal. However, if this preselected amount has not been reached, the downloaded information is still provided to central system 160, although the secure panel of farebox 110 is not released. Accordingly, bus 170 may be put back into service more speedily with confidence that sufficient space remains in cashbox 112 of farebox 110 to store more collected monies. Furthermore, the transaction information downloaded from farebox 110 is immediately available for processing by central system 160 and is also protected from loss such as by a catastrophic failure of farebox 110. This procedure further eliminates the needless handling of cashboxes having only a very small amount of monies stored therein. Of course, where it is desired to provide for the physical counting of the monies of a cashbox upon successful probing, the determination of the cashbox containing a preselected threshold amount of monies may be omitted and the secure panel of farebox 110 released regardless of the amount of monies contained in the cashbox.

Once the secure panel of farebox 110 is released, the revenue worker removes cashbox 112 and replaces it with empty cashbox 111, closing and locking the secure access panel. Thereafter, bus 170 is ready to return to service.

When removed, cashbox 112 is preferably transported to a money room before its opening. Accordingly, an accurate count of the monies actually received by the particular farebox 110, to which cashbox 112 was coupled, may be had. In the preferred embodiment of cashbox 112, the monies stored therein are protected from removal by shutters closing the access points of the storage areas of the coins and notes. Accordingly, any tampering with cashbox 112, as transported between bus 170 and the money room, may easily be detected. However, in a preferred embodiment of the present invention, a secure cash box cart is utilized by the revenue worker to securely store and transport a plurality of cashboxes to the money room for counting.

The money room of the preferred embodiment of the present invention includes a counting station having note counter 140 and coin counter 150 coupled to central system 160. Accordingly, information with respect to coins and notes actually counted from cashbox 112 may be provided to central system 160 for comparison with the information downloaded from farebox 110.

In order to associate the information of the counted coins and notes with the proper information downloaded from farebox 110, the counting station of the preferred embodiment of the present invention also includes a cashbox ID reader, such as might be disposed on coin counter 150, coupled to the central system. This cashbox ID reader is a receiver adapted to read the machine readable information provided on the preferred embodiment of cashbox 112. Where cashbox 112 is adapted as shown and described in the above referenced patent application entitled "Configurable Cashbox," the cashbox ID reader is a touch memory utility (TMU) button receiver, available from Dallas Semiconductor, Dallas, Texas, disposed to couple with a TMU button provided on cashbox 112.

The embodiment of cashbox 112 shown and described in the above referenced patent application entitled "Configurable Cashbox" is adapted to allow the removal of coins stored therein through the bottom of the cashbox. Accordingly, in a preferred embodiment, coin counter 150 is adapted to receive cashbox 112 thereon such that opening of a coin retainer of cashbox 112 results in the discharge of the coins stored therein into a coin receiving area of coin counter 150.

Accordingly, it shall be appreciated that the cashbox ID reader may be disposed on or near coin counter 150 such that, upon placing of cashbox 112 on coin counter 150 for emptying of coins, the unique identification information may be read and transmitted to central system 160 substantially contemporaneously with the counting of the coins and the transmission of this information to central system 160. It shall also be appreciated, in the above embodiment of cashbox 112, that the notes stored therein are provided in a tightly bundled stack, all facing a same direction, separate from the coins. Accordingly, the notes may be removed from cashbox 112 and placed directly in note counter 140 for counting substantially contemporaneously with the counting of the coins and the transmission of this information to central system 160. Once emptied, cashbox 112 again becomes available for insertion into a farebox and is returned for service as cashbox 111.

Alternatively, note counter 140 may be adapted to receive the stored notes from cashbox 112 without substantial operator interaction. For example, note counter 140 may be disposed in proper relation to coin counter 150 such that cashbox 112 may be coupled to both simultaneously. Thereafter, note retainers within cashbox 112 may be released to allow a biased support surface within cashbox 112 to present the notes to note counter 140 for automated counting. It should be appreciated that this alternative embodiment of the counting station may be utilized to provide additional security as a counting worker may be prevented direct access of the stored and counted monies.

Having described the configuration of a preferred embodiment of the present invention, a description of the operation of components of a preferred embodiment of system 100 will now be given. Directing attention to FIG. 2, a flow diagram of a process of the controller of farebox 110 allowing the use of farebox 110 in conducting transactions is shown.

As farebox 110 registers transactions for accountability and reporting purposes, the preferred embodiment of the present invention requires identification of an operator of farebox 110 prior to its use. This information is recorded for downloading to central system 160 and may thus be used in reporting or determining a source of discrepancies.

Figure 2:
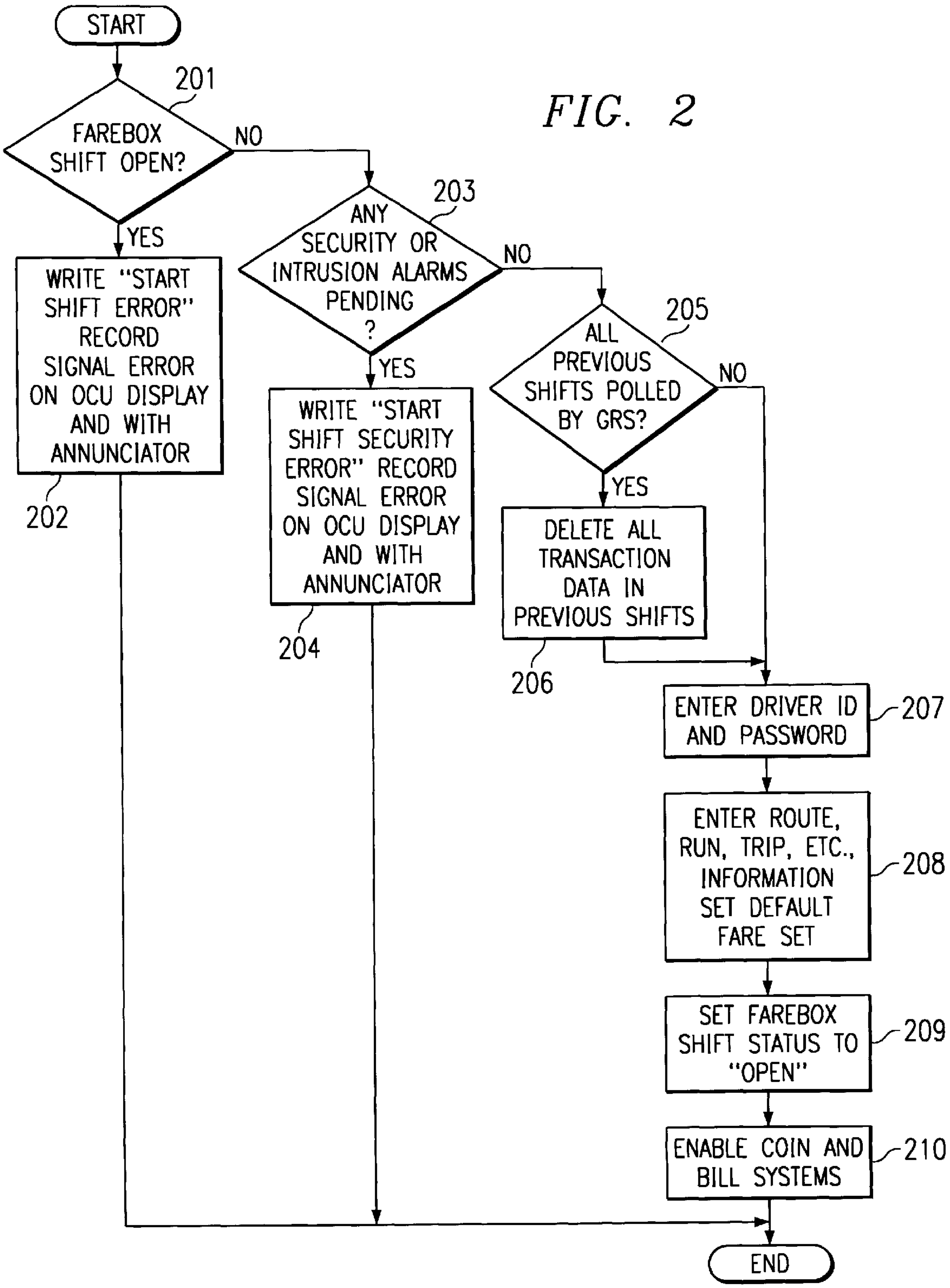
FIG. 2 shows a flow diagram of the operator start farebox shift process of the farebox of FIG. 1.

Referring to FIG. 2, an operator of farebox 110 indicates that he wishes to log in or start his/her shift. Accordingly, at step 201 the controller of farebox 110 makes a determination as to whether a farebox shift is opened, i.e., the farebox has already been placed in service for conducting transactions. If an operator shift has already been opened, then at step 202 the farebox makes an entry in its database that a start shift error has occurred. Error information is also preferably presented to the operator, such as on a display of an operator control unit (OCU). Thereafter, the start shift process is ended.

If, however, it is determined that a farebox shift has not already been opened at step 201, then processing proceeds to step 203. At step 203 a determination is made as to whether any security or intrusion alarms are pending. These alarms may include detection of a secure panel being open, no cashbox being inserted into the farebox, and the like. In order to provide a desired level of security for the monies to be collected by farebox 110, if alarms are pending, processing proceeds to step 204 where the farebox makes an entry in its database that a start shift security error has occurred. Error information is also preferably presented to the operator, such as on the display of the OCU. Thereafter, the start shift process is ended.

If, however, it is determined that no security or intrusion alarms are pending at step 203, then processing proceeds to step 205. At step 205 a determination is made as to whether all previous shifts have been polled by the garage revenue station (GRS). If all previous shifts have been polled, then processing proceeds to step 206 where all transaction data associated with the previously polled shifts is deleted from farebox 110. Thereafter, processing proceeds to step 207.

If all previous shifts have not been polled, then processing proceeds to step 207. At step 207, the operator enters his/her assigned ID and password. Thereafter, at step 208, information with respect to the route, run, trip, fare set, etcetera are entered into farebox 110. At step 209, the farebox shift status is set to open and, thereafter, at step 210 the coin and note systems of the farebox are enabled.

Figure 3:
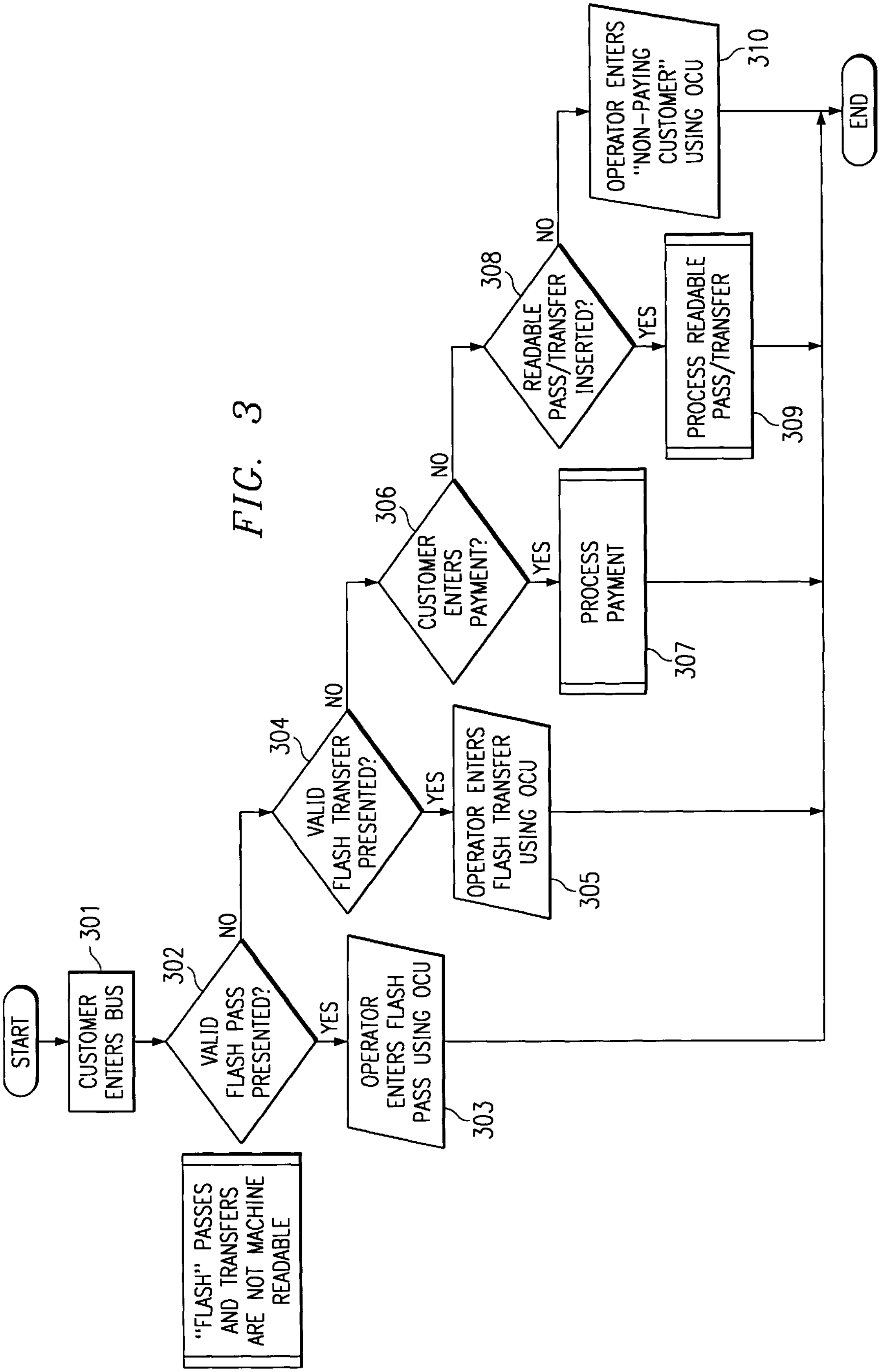
FIG. 3 shows a flow diagram of the interaction of a patron with the farebox of FIG. 1.

Once the operator has successfully begun his shift, farebox 110 is placed in operation for conducting transactions with patrons. Directing attention to FIG. 3, a flow diagram of interaction of a patron with farebox 110 in conducting a transaction is illustrated. Initially the patron enters bus 170 in which farebox 110 is disposed at step 301. Thereafter, the bus operator determines if the patron presents a valid flash pass at step 302. It shall be appreciated that a flash pass is a pass which is not machine readable and, therefore, must be viewed by an operator. If a valid flash pass is presented, the operator enters the appropriate information in the OCU at step 303 and the patron is admitted to the bus.

If a valid flash pass is not presented at step 302, the bus operator determines if the patron presents a valid flash transfer at step 304. A flash transfer, like a flash pass, is not machine readable and, therefore, must be viewed by an operator. If a valid flash transfer is presented, the operator enters the appropriate information in the OCU at step 305 and the patron is admitted to the bus.

It shall be appreciated that although the flash pass and flash transfer are not machine readable, the farebox of the preferred embodiment allows for operator input of these transactions. Entry of this information allows for a more complete database of transaction information to be stored and analyzed, such as may be useful in route planning etcetera. Of course, where such information is not desired, entry of information by the operator may be omitted.

If no valid flash transfer was presented in step 304, then the farebox determines if the patron entered a payment into the coin chute and/or note chute of farebox 110. If payment was entered then farebox 110 proceeds to register and process the payment at step 307, and the patron is permitted to enter the bus.

If no payment was entered at step 306, then the farebox determines if a readable pass or transfer was inserted in the farebox, such as in the note chute of farebox 110, at step 308. If a readable pass or transfer was entered then farebox 110 proceeds to validate and record the pass or transfer information and the patron is permitted to enter the bus at step 309.

If no readable pass or transfer was entered at step 308, then the operator may eject the patron from the bus or, circumstances permitting, enter information in the OCU reflecting a non-paying patron at step 310.

It shall be appreciated that the farebox of the present invention may store various other information associated with conducting transactions with that described above, including a time of the transaction, a location of the transaction, a particular fare purchased, and the like. Input and storage of this associated information as well as the registering and processing of the received payments is shown and described in detail in the above referenced patent application entitled "Automatic Validating Farebox System and Method."

Figure 4:
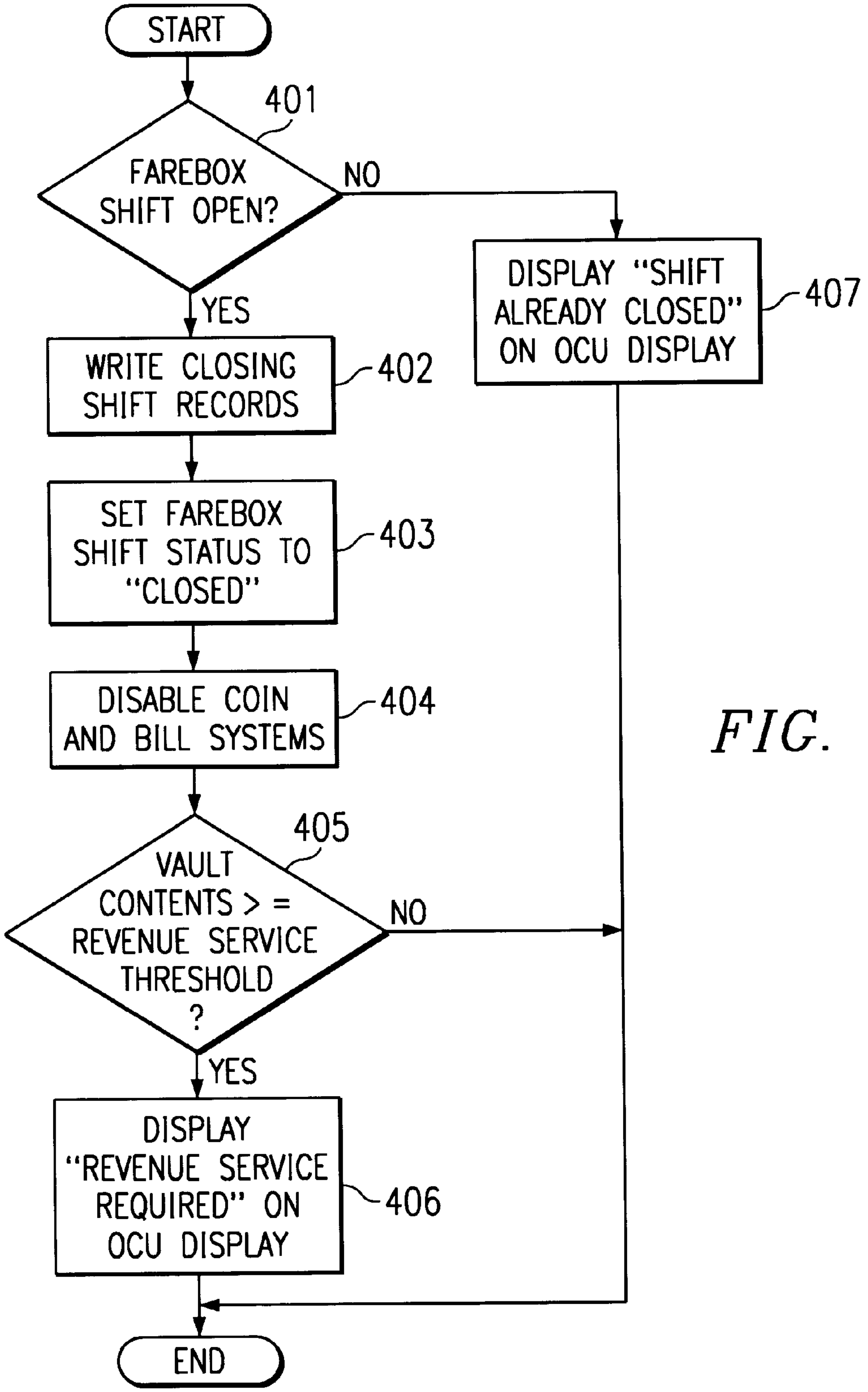
FIG. 4 shows a flow diagram of the operator end farebox shift process of the farebox of FIG. 1.

At selected times farebox 110 may be probed for information and/or emptied of its receipts. One such time is preferably at the end of an operator's shift when the farebox has been disabled from conducting additional transactions. Directing attention to FIG. 4, a flow diagram of a process for ending an operator's shift and preparing farebox 110 for probing by probe unit 120 shown.

At step 401 a determination is made as to whether a farebox shift is open. If no farebox shift is currently open, processing proceeds to step 407 wherein an error message is displayed on the OCU and the end shift process terminates.

If, however, a farebox shift is opened at step 401, then processing proceeds to step 402. At step 402 farebox 110 writes closing shift records. At step 403 farebox 110 sets the farebox shift status to closed and, thereafter, at step 404 disables the coin and note systems.

At step 405 a determination is made as to whether the contents of the cashbox of farebox 110 are greater than or equal to a preestablished revenue service threshold. As previously discussed, this revenue service threshold may be selected so as to allow partially filled cashboxes to remain in service and, thus, avoid their unnecessary handling. This threshold may also be selected in light of consideration as to an amount of collected money considered safe to remain in the environment into which farebox 110 is deployed. Accordingly, the threshold may be altered depending on a time of day or a particular area bus 170 is to be operated in.

If the revenue service threshold has not been met or exceeded, then the end farebox shift process is terminated. However, if the revenue service threshold has been met or exceeded, then processing proceeds to step 406 wherein a revenue service required message is displayed on the OCU. Thereafter the end farebox shift process is terminated.

It shall be appreciated that once the end farebox shift process has terminated, farebox 110 is in condition for probing by probe unit 120 as discussed above. Directing attention to FIGS. 5A through 5C, a flow diagram of the revenue service process of a preferred embodiment of the present invention is shown.

At step 501 a determination is made as to whether a data link has been established with the GRS through probe unit 120. If no link has been established then processing is terminated. However, if a data link has been established processing proceeds to step 502 where the end farebox shift process is performed if not already completed. Thereafter, at step 503, the farebox transaction data is transferred to the GRS through the data link.

At step 504 a determination is made as to whether the data transfer from farebox 110 to probe unit 120 was successful. If the transfer was not successful, processing proceeds to step 505 where a data transfer error record is written and, thereafter, to step 506 where a data probing status is set to unsuccessful. Processing then proceeds to step 507. It shall be appreciated that if the data transfer is not determined to be successful at step 504, multiple transfer attempts may be made rather than the immediate writing of an error record as shown.

If the data transfer is determined to be successful at step 504, processing proceeds to step 507. At step 507 farebox 110 receives new data and/or programs uploaded from the GRS. This new data may include a new fare set, additional operators which may log in to the farebox, existing operator which may no longer log in to the farebox, identification of particular cashboxes authorized for use with a particular farebox, identification of particular cashboxes no longer authorized for use with the system (such as cashboxes missing from inventory which may later be returned to inventory having their locks and security features jimmied), and the like. The programs uploaded may be modification of operating instructions for the controller of farebox 110, a new instruction set to replace an old instruction set, or program modules to modify or add features of the operation of farebox 110. After step 507, processing proceeds to step 508 wherein a determination is made as to whether the uploaded data was received by farebox 110 successfully. If the data was not received, processing proceeds to steps 509 and 510 where a data receive error record is written and a data probing status is set to unsuccessful, respectively. Of course, where there are no new programs or data to upload, steps 507 through 510 may be omitted, if desired.

If the uploaded data was received successfully by farebox 110, processing proceeds to step 511 where a determination is made as to the success of data probing, such as through reference to the aforementioned data probing status. If data probing is not successful, processing proceeds to step 512 where a data probing error is displayed and the revenue service process is terminated. This error message may be presented on the patron display of the preferred embodiment of farebox 110 in order to be readily visible to the revenue worker probing the farebox. Additionally, or alternatively, the error message may be transmitted to probe unit 120 for display thereon.

If data probing is successful, processing proceeds to step 513 where a determination is made as to whether the revenue service threshold has been reached. If the revenue service threshold has not been reached, processing proceeds to step 514 where no revenue service required is indicated and the revenue service process is terminated. If, however, the revenue service threshold is reached, processing proceeds to step 515 where a secure panel is released to expose cashbox 112 for removal from farebox 110.

At step 516 a determination is made as to whether the cashbox has been removed from farebox 110. If the cashbox has not been removed, processing proceeds to step 517 where a determination is made as to whether a removal timeout has expired. If the cashbox removal timeout has expired, processing proceeds to step 518 where a security alarm removal timeout record is written and error message is displayed. Thereafter, processing proceeds to step 532 where farebox is set in an out of service mode due to possible security breach.

If, however, the cashbox removal timeout has not expired, processing proceeds to step 519 where a determination is made as to whether the secure panel is closed. If the secure panel is closed, processing proceeds to step 520 where a security alarm revenue service interrupted record is written and error message is displayed. Thereafter, processing proceeds to step 532 where farebox 110 is set in an out of service mode due to possible security breach. However, if the secure panel is not closed, processing returns to step 516 for another determination as to whether the cashbox has been removed.

If at step 516 it is determined that the cashbox has been removed from farebox 110, processing proceeds to step 521 where the totals with respect to the contents of the cashbox stored in farebox 110 are cleared and, therefore, readied for the insertion of a new cashbox. Thereafter, processing continues to step 522 where a determination is made as to whether an empty cashbox has been inserted into farebox 110. It shall be appreciated that, as the preferred embodiment of the controller of farebox 110 reads unique identification information associated with each cashbox, this determination may be made by polling a receiver adapted to read machine readable unique cashbox identification information. Moreover, as this information is unique to each cashbox, reinsertion of the cashbox just removed or insertion of a cashbox having an ID corresponding to that of a database of cashboxes not to be used may be detected and avoided. Accordingly, attempts at compromising the security of farebox 110 may be avoided.

If the cashbox has not been replaced, processing proceeds to step 523 where a determination is made as to whether a replacement timeout has expired. If the cashbox replacement timeout has expired, processing proceeds to step 524 where a security alarm replacement timeout record is written and error message is displayed. Thereafter, processing proceeds to step 532 where farebox is set in an out of service mode due to possible security breach.

If, however, the cashbox replacement timeout has not expired, processing proceeds to step 525 where a determination is made as to whether the secure panel is closed. If the secure panel is closed, processing proceeds to step 526 where a security alarm revenue service interrupted record is written and error message is displayed. Thereafter, processing proceeds to step 532 where farebox 110 is set in an out of service mode due to possible security breach. However, if the secure panel is not closed, processing returns to step 522 for another determination as to whether the cashbox has been replaced.

If at step 522 it is determined that the cashbox has been replaced in farebox 110, processing proceeds to step 527 where a determination is made as to whether the secure panel of farebox 110 is closed. If the secure panel is not closed, processing proceeds to step 528 wherein a determination is made as to whether a secure panel closed timeout has expired. If the timeout has expired processing proceeds to step 529 where a security alarm door open record is written and error message is displayed. Thereafter, processing proceeds to step 532 where farebox is set in an out of service mode due to possible security breach. If, however, the secure panel closed timeout has not expired, processing returns to step 527 for another determination as to whether the secure panel has been closed.

If it is determined that the secure panel has been closed at step 527, processing proceeds to step 530. At step 530 a determination is made as to whether the cashbox ID of the replacement cashbox is the same as the cashbox removed. If the cashbox ID remains unchanged, processing proceeds to step 531 where a security alarm same cashbox record is written and error message is displayed. Thereafter, processing proceeds to step 532 where farebox is set in an out of service mode due to possible security breach. If, however, the cashbox ID is not the same, processing proceeds to step 533 where the revenue service process is reported as being successful and the process terminates.

It shall be appreciated that various intrusion and security errors are generated according to the process outlined above. These errors are preferably cleared with a security reset command entered at the OCU of farebox 110 by an authorized individual in order to put farebox 110 back into service or, in some case, by correcting the condition that caused the alarm to begin with.

Figure 6:
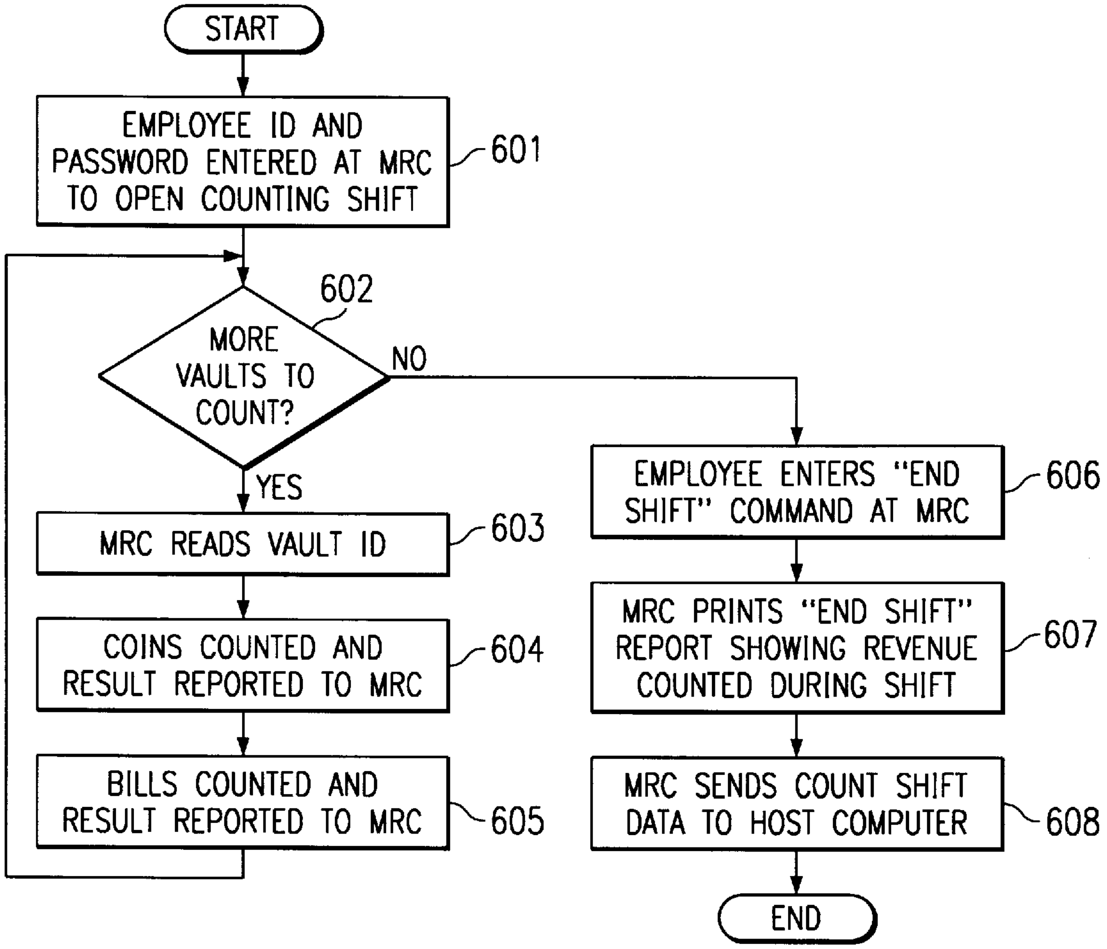
FIG. 6 shows a flow diagram of the money room process of the system of FIG. 1.

Having described the revenue service process which allows the removal of cashboxes from a preferred embodiment of farebox 110, the preferred embodiment of the money room process according to the present invention will be described with reference to the flow diagram of FIG. 6. In the preferred embodiment, cashboxes removed from the fareboxes are brought into the money room unopened, i.e., securely closed to protect their contents and, therefore, contain the same monies as collected by the farebox in which they were inserted. The cashboxes are taken to a money room station for counting. As previously mentioned, the money room station includes a coin counter, a bill counter, and a cashbox ID reader. The money room station may also include a computer or terminal coupling the above components to a central system and/or allowing for money room worker interaction with these components and the central system.

Preferably, a single money room worker operates the money room station. This individual opens the cashboxes and places the monies contained therein into the counters of the money room station.

For accountability and reporting purposes, the preferred embodiment of the present invention requires identification of a money room worker prior to operation of the money room station. Accordingly, at step 601 the money room worker inputs an ID and password to open a counting shift.

Thereafter, at step 602 a determination is made as to whether there are cashboxes for which money is to be counted. If there are cashboxes requiring counting, the process proceeds to step 603 wherein the cashbox unique identification information is read. Preferably, this information is transmitted to the central system for matching with information downloaded from a corresponding farebox. Transmission of this information to the central system may be real time, or may be at a later time, such as upon completion of operations with respect to a particular cashbox.

At steps 604 and 605 the coins and notes contained in the cashbox are counted, respectively. This information is also preferably provided to the central system for matching with information downloaded for a corresponding farebox. Thereafter, the process returns to step 602 for a determination as to whether additional cashboxes require counting.

If it is determined at step 602 that no more cashboxes require counting, the process proceeds to step 606 where the money room worker enters an end shift command. Thereafter, at step 607, an end shift report showing revenue counted during the shift and, thus creating a paper trail for the monies removed from the secure confines of the cashbox, is created. At step 608 the money room station transmits the cashbox ID and count information to the central system for processing and the process terminates.

Although specific examples of use of the present invention has been shown and described with respect to passenger fare collection, it shall be appreciated that the present invention may be utilized in any number of situations. For example, the present invention may be used to provide accountability for any number of different point of sale transactions including entrance to a movie theater or sporting event and even in the vending of goods such as through coupling with a goods vending apparatus.

Although the present invention and its advantages have been described in detail, it should be understood that various changes, substitutions and alterations can be made herein without departing from the spirit and scope of the invention as defined by the appended claims.

What is claimed is:

1. A method for accounting for transactions processed by a transaction station, wherein transaction information from the transaction station is reconciled with a count of items removed from the transaction station, the method comprising the steps of:

downloading transaction information and bin identification information stored in the transaction station to a memory of a processor based system external to the transaction station, wherein the transaction information includes data with respect to items stored in a removable bin associated with the transaction station and the bin identification information includes data with respect to identification of the bin storing the items;

releasing a security panel on the transaction station upon successful completion of the downloading transaction information to thereby expose the coupled removable bin;

removing the coupled removable bin from the transaction station;

reading machine readable bin identification information provided on the bin;

storing the read bin identification information in the memory of the processor based system;

counting the items stored in the removed bin separately from any other items and storing count information in the memory of the processor based system; and comparing the downloaded transaction information with the count information.

2. The method of claim 1, further comprising the steps of:

coupling the removable bin to the transaction station wherein a transaction station device for reading machine readable information identifying the bin thereby reads the machine readable bin identification information; and storing the read bin identification information in a memory of the transaction station for use in the downloading step.

3. The method of claim 2, wherein the step of downloading transaction information comprises the steps of:

coupling the transaction station to the processor based system.

4. The method of claim 1, wherein the step of removing the coupled removable bin must be accomplished within a predetermined timeout of the releasing of the security panel.

5. The method of claim 1, further comprising the step of:

coupling a different removable bin to the transaction station upon removal of the coupled removable bin from the transaction station.

6. The method of claim 5, wherein the step of coupling the different removable bin to the transaction station must be accomplished within a predetermined timeout of the removal of the coupled removable bin from the transaction station.

7. The method of claim 1, further comprising the step of:

storing the transaction information in the memory of the transaction station at a point of sale.

8. The method of claim 1, wherein the transaction station comprises:

electronic controller circuitry.

9. The method of claim 8, wherein the note acceptor is adapted to receive a plurality of different value notes, and wherein the note acceptor determines the value of each validated received note, wherein the information with respect to each validated received note includes the value of the note.

10. The method of claim 1, wherein the removable bin comprises:

a case for storing bills and coins, wherein the case includes a bill opening disposed to accept an unfolded planar face of a bill, wherein the case also includes a coin opening;

a bill storage insert having a bill storage opening disposed to accept an unfolded planar face of a bill, a bill receiving surface disposed to receive an unfolded planar face of a bill, a bill retainer disposed at the bill storage opening of the bill storage insert adapted to allow passage of a planar face of a bill when received into the bill storage insert and to retain the bill thereafter, and a biasing mechanism coupled to the bill receiving surface to tightly compress received bills between the bill receiving surface and the bill retainer, wherein the bill storage insert is adapted for insertion into the case and having means for mounting to hold the bill storage opening of the bill storage insert in juxtaposition with the bill opening of the case; and a bill shutter to close the bill opening of the case, wherein the bill shutter includes a tambour door disposed in a track on the case to allow retraction to open the bill opening of the case and expose the bill storage opening of the bill insert, and a locking mechanism disposed at an end of the tambour door to provide locking of the tambour door when in a closed position.

11. The method of claim 10, wherein the case further comprises:

a latch mechanism to securely couple the case in the transaction station, wherein the latch may only be released by fully closing and locking the bill shutter.

12. The method of claim 1, wherein the machine readable bin identification information is stored in a touch memory utility button coupled to the bin.

13. A system for accounting for transactions processed by a plurality of transaction stations, wherein transaction information from a particular transaction station is reconciled with a count of items removed from the transaction station, the system comprising:

a transaction station comprising:

electronic controller circuitry;

a coin acceptor coupled to the electronic controller circuitry, wherein the coin acceptor is adapted to receive a plurality of different value coins, and wherein the coin acceptor automatically validates the received coins and determines the value of each validated received coin, wherein the value of each validated received coin is communicated to the electronic controller circuitry; and a note acceptor coupled to the electronic controller circuitry, wherein the note acceptor is adapted to receive a plurality of different value notes, and wherein the note acceptor automatically validates the received notes and determines the value of each validated received note, wherein the value of each validated received note is communicated to the electronic controller circuitry;

means for downloading transaction information and bin identification information stored in said transaction station to a memory of a processor based system external to the transaction station, wherein the transaction information includes data with respect to items stored in a removable bin associated with the transaction station and the bin identification information includes data with respect to identification of the bin storing the items;

means for coupling the removable bin to a device for reading machine readable information identifying the bin and thereby read the machine readable bin identification information;

means for storing read bin identification information in the memory of the processor based system;

means for counting the items stored in the removed bin separately from any other items and for storing information with respect to the counting of the items in the memory of the processor based system; and means for comparing the downloaded transaction information with the information with respect to the counting of the items.

14. The system of claim 13, further comprising:

means for coupling the removable bin to the transaction station; and means coupled to the transaction station for reading machine readable information identifying the bin.

15. The system of claim 14, wherein the downloading means comprises:

means for coupling the transaction station to the processor based system.

16. The system of claim 15, wherein the coupling means of the downloading means includes a wireless connection.

17. The system of claim 16, wherein the wireless connection is infrared.

18. The system of claim 15, further comprising:

means for releasing a security panel on the transaction station upon successful completion of the downloading transaction information to thereby expose the coupled removable bin.

19. The system of claim 13, further comprising:

means for storing the transaction information in the memory of the transaction station at a point of sale.

20. The system of claim 13, wherein the transaction station further comprises:

a note stacker adapted to receive the accepted notes from the note acceptor and output the accepted notes into a tightly compressed note stack in the removable bin.

21. The system of claim 13, wherein the removable bin comprises:

a case for storing bills and coins, wherein the case includes a bill opening disposed to accept an unfolded planar face of a bill, wherein the case also includes a coin opening;

a bill storage insert having a bill storage opening disposed to accept an unfolded planar face of a bill, a bill receiving surface disposed to receive an unfolded planar face of a bill, a bill retainer disposed at the bill storage opening of the bill storage insert adapted to allow passage of a planar face of a bill when received into the bill storage insert and to retain the bill thereafter, and a biasing mechanism coupled to the bill receiving surface to tightly compress received bills between the bill receiving surface and the bill retainer, wherein the bill storage insert is adapted for insertion into the case and having means for mounting to hold the bill storage opening of the bill storage insert in juxtaposition with the bill opening of the case; and a bill shutter to close the bill opening of the case, wherein the bill shutter includes a tambour door disposed in a track on the case to allow retraction to open the bill opening of the case and expose the bill storage opening of the bill insert, and a locking mechanism disposed at an end of the tambour door to provide locking of the tambour door when in a closed position.

22. The system of claim 21, wherein the case further comprises:

a latch mechanism to securely couple the case in the transaction station, wherein the latch may only be released by fully closing and locking the bill shutter.

23. The system of claim 13, wherein the machine readable bin identification information is stored in a touch memory utility button coupled to the bin.

24. A system for accounting for transactions processed by a plurality of transaction stations, the system comprising:

a plurality of transaction stations each having a removable currency container and electronic circuitry adapted to record transaction information, wherein the currency container includes machine readable unique identification information readable by the electronic circuitry, and wherein the electronic circuitry stores in association with recorded transaction information unique identification information read from the currency container; and a processor based system having an interface adapted to receive transaction information and currency container unique identification information stored in a transaction station of the plurality of transaction stations and an interface adapted to receive information with respect to an accounting of the actual contents of a currency container associated with the transaction station discrete from information with respect to any other currency container, wherein the processor based system comprises a counting station having a coin counter and a note counter, wherein contents of the currency container associated with the transaction station are deposited into the coin counter and note counter independent of contents of any other currency container.

25. The system of claim 24, wherein the coin counter is disposed to couple with the currency container associated with the transaction station to directly receive coins stored therein for counting.

26. The system of claims 25, wherein the note counter is disposed to couple with the currency container associated with the transaction station to directly receive notes stored therein for counting.

27. The system of claim 24, wherein the currency container associated with the transaction station includes a locking mechanism adapted to hold the currency container in container in mechanical communication with the transaction station and to release the currency container from the transaction station only when an access opening on the currency container is closed and locked, wherein the access opening on the currency container remains closed and locked until the accounting of the actual contents of a currency container associated with the transaction station.

28. The system of claim 24, wherein the plurality of transaction stations provide automated receipt of coins and notes for verification and tallying and segregated storage in the currency container.

29. The system of claim 24, wherein the plurality of transaction stations comprise:

a door securing physical access to the currency container, wherein downloading of the transaction information stored in the transaction station to the processor based system operates to cause a locking mechanism of the door to release.

30. The system of claim 24, wherein the interface adapted to receive transaction information and currency container unique identification information stored in the transaction station includes an infrared data link.

31. The system of claim 24, wherein the processor based system comprises:

an instruction set for reporting discrepancies between the actual contents of the currency container accounted for by the processor based system and the transaction information received from the transaction station.

32. A system for accounting for transactions processed by a plurality of transaction stations, the system comprising:

a plurality of transaction stations having a removable secure currency container and electronic circuitry adapted to record transaction information, wherein the currency container includes machine readable unique identification information readable by the electronic circuitry, and wherein the electronic circuitry stores in association with recorded transaction information unique identification information read from the currency container;

a transaction station probe having an interface adapted to establish information communication with the plurality of transaction stations and to receive transaction information and currency container unique identification information stored in the transaction station, wherein the probe downloads the transaction information stored in the transaction station upon an occurrence of a preestablished event, and wherein the probe interrogates the currency container content total information stored in the transaction station upon the occurrence of the preestablished event and downloads the currency container content total information if a preestablished threshold with respect to the currency container content total information is reached;

an automated currency counter adapted to receive currency from the currency containers removed from the plurality of transaction stations; and a processor based system coupled to the probe and to the currency counter, wherein the processor based system receives transaction information and unique identification information of a currency container storing currency associated with the transaction information for a particular transaction station from the probe and associates the received information with information with respect to currency counted for the corresponding currency container from the currency counter.

33. The system of claim 32, wherein the plurality of transaction stations are fareboxes mounted in busses.

34. The system of claim 33, wherein the plurality of transaction stations are electronically coupled to the bus to which they are mounted in order to receive transaction information therefrom.

35. The system of claim 32, wherein the transaction stations and the secure currency containers interact to prevent access to monies received by the transaction station and stored in the currency containers except to authorized persons.

36. The system of claim 32, wherein the plurality of transaction stations provide automated receipt of coins and notes for verification and tallying and subsequent segregated storage in the currency container.

37. The system of claim 32, wherein the plurality of transaction stations comprise:

information with respect to currency container content totals discrete from the transaction information; and a door securing physical access to the currency container, wherein downloading of the currency container content total information stored in the transaction station by the probe causes a locking mechanism of the door to release.

38. The system of claim 32, wherein the preestablished event is selected from the group consisting of:

a transaction station operator change;

an out of service condition of the transaction station host environment; and a currency container full condition.

39. The system of claim 32, wherein the interface of the probe for establishing information communication with the plurality of transaction stations includes an infra red data link.

40. The system of claim 32, wherein the probe comprises:

a radio frequency link adapted to establish information communication with the processor based system, wherein the coupling of the processor based system to the probe utilizes the radio frequency link.

41. The system of claim 40, wherein the probe provides the transaction information and currency container unique identification information received from a probed transaction station in real time to the processor based system.

42. The system of claim 32, wherein the probe comprises:

a memory for storing the transaction information and currency container unique identification information received from a probed transaction station for subsequent downloading to the processor based system.

43. The system of claim 32, wherein the processor based system comprises:

an instruction set for reporting discrepancies on a currency container level between the transaction information stored by the transaction stations and the information with respect to currency counted from the currency counter.

44. The system of claim 32, wherein the transaction information stored by the transaction stations includes transaction detail selected from the group consisting of:

an individual transaction amount;

an individual transaction time;

an individual transaction location; and an individual transaction type.

45. The system of claim 44, wherein the processor based system comprises:

an instruction set for compiling statistical information with respect to transactions on a transaction station level at least in part from the transaction information stored by the transaction stations.

46. The system of claim 45, wherein the statistical information is also at least in part compiled from the information with respect to currency counted from the currency counter.

47. A method for accounting for fareboxes, wherein recorded receipts of a particular farebox are reconciled with a count of currency removed from the farebox independent of any other farebox of a plurality of fareboxes, the method comprising the steps of:

coupling a first cashbox to a first farebox of the plurality of fareboxes, wherein the first cashbox includes machine readable information coupled thereto;

reading the machine readable information of the coupled first cashbox;

storing the read machine readable information of the coupled first cashbox in a memory of the first farebox;

storing receipt information in the memory of the first farebox, wherein the receipt information includes data with respect to currency collected by the first farebox and stored in the first cashbox;

downloading the stored receipt information and stored machine readable information from the first farebox to a central system;

removing the coupled first cashbox from the first farebox;

reading the machine readable information of the removed first cashbox;

storing the read machine readable information of the removed first cashbox in a memory of the central system;

counting the currency stored in the removed first cashbox, wherein the counting step is operable to count only currency associated with the removed first cashbox;

storing currency count information from the counting step in the central system; and comparing the downloaded receipt information and stored machine readable information to the read machine readable information of the removed first cashbox and the stored currency count information associated with the removed first cashbox.

48. The method of claim 47, wherein the step of downloading comprises the step of:

establishing a wireless data link between the first farebox and the central system.

49. The method of claim 48, wherein the wireless data link includes the use of a portable device disposed in close proximity to the first farebox when downloading.

50. The method of claim 49, wherein the step of establishing a wireless data link comprises the step of:

establishing a first wireless data link between the portable device and the first farebox and a second wireless data link between the portable device and the central system.

51. The method of claim 50, wherein the first wireless data link is an infrared data link.

52. The method of claim 50, wherein the second wireless data link is a radio frequency data link.

53. The method of claim 47, further comprising:

coupling a second cashbox to the first farebox after the step of removing the first cashbox is complete, wherein the step of coupling the second cashbox must be completed within a predetermined time of the removal of the first cashbox to avoid an error condition.

54. The method of claim 47, wherein the first farebox comprises:

electronic controller circuitry;

a coin acceptor coupled to the electronic controller circuitry, wherein the coin acceptor is adapted to receive a plurality of different value coins, and wherein the coin acceptor automatically validates the received coins and determines the value of each validated received coin, wherein the value of each validated received coin is communicated to the electronic controller circuitry;

a note acceptor coupled to the electronic controller circuitry, wherein the note acceptor is adapted to receive a plurality of different value notes, and wherein the note acceptor automatically validates the received notes and determines the value of each validated received note, wherein the value of each validated received note is communicated to the electronic controller circuitry; and a note stacker adapted to receive the accepted notes from the note acceptor and output the accepted notes into a tightly compressed note stack in the removable bin.

55. The method of claim 47, wherein the first cashbox comprises:

a case for storing bills and coins, wherein the case includes a bill opening disposed to accept an unfolded planar face of a bill, wherein the case also includes a coin opening;

a bill storage insert having a bill storage opening disposed to accept an unfolded planar face of a bill, a bill receiving surface disposed to receive an unfolded planar face of a bill, a bill retainer disposed at the bill storage opening of the bill storage insert adapted to allow passage of a planar face of a bill when received into the bill storage insert and to retain the bill thereafter, and a biasing mechanism coupled to the bill receiving surface to tightly compress received bills between the bill receiving surface and the bill retainer, wherein the bill storage insert is adapted for insertion into the case and having means for mounting to hold the bill storage opening of the bill storage insert in juxtaposition with the bill opening of the case; and a bill shutter to close the bill opening of the case, wherein the bill shutter includes a tambour door disposed in a track on the case to allow retraction to open the bill opening of the case and expose the bill storage opening of the bill insert, and a locking mechanism disposed at an end of the tambour door to provide locking of the tambour door when in a closed position.

56. A method for accounting for transactions processed by a transaction station, wherein transaction information from the transaction station is reconciled with a count of items removed from the transaction station, the method comprising the steps of:

downloading transaction information and bin identification information stored in the transaction station to a memory of a processor based system external to the transaction station, wherein the transaction information includes data with respect to items stored in a removable bin associated with the transaction station and the bin identification information includes data with respect to identification of the bin storing the items;

reading machine readable bin identification information provided on the bin;

storing the read bin identification information in the memory of the processor based system;

counting the items stored in the removed bin separately from any other items and storing count information in the memory of the processor based system; and comparing the downloaded transaction information with the count information;

wherein the transaction station comprises:

electronic controller circuitry;

a coin acceptor coupled to the electronic controller circuitry, wherein the coin acceptor is adapted to receive a plurality of different value coins, and wherein the coin acceptor automatically validates the received coins and determines the value of each validated received coin, wherein the value of each validated received coin is communicated to the electronic controller circuitry;

a note acceptor coupled to the electronic controller circuitry, wherein the note acceptor automatically validates the received notes, wherein information with respect to each validated received note is communicated to the electronic controller circuitry; and a note stacker adapted to receive the accepted notes from the note acceptor and output the accepted notes into a tightly compressed note stack in the removable bin.

* * * * *